Dec. 16, 1952             C. BERG             2,621,575
DEPTH CONTROL OF TRACTOR-CARRIED ARGICULTURAL IMPLEMENTS
Filed Aug. 3, 1945
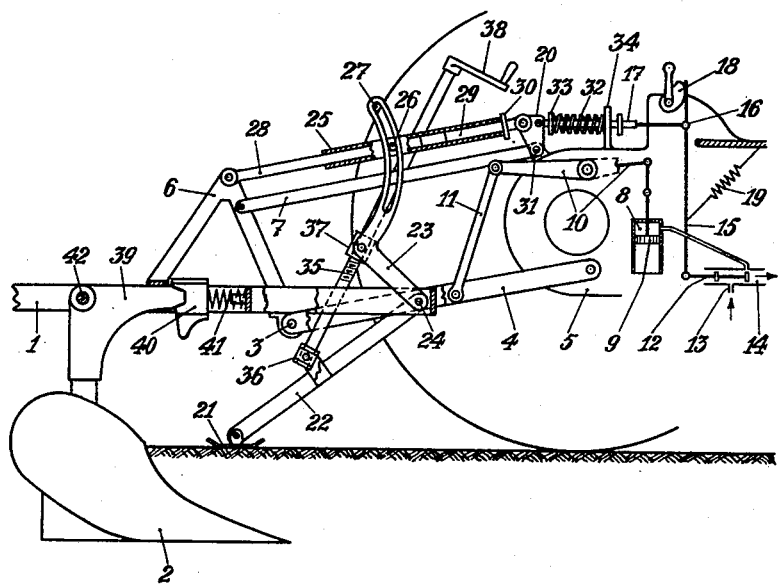
Inventor
Claes Berg
by Sommers·Young
Attorneys Patented Dec. 16, 1952

2,621,575

UNITED STATES PATENT OFFICE 2,621,575

DEPTH CONTROL OF TRACTOR-CARRIED AGRICULTURAL IMPLEMENTS

Claes Berg, Overum, Sweden, assignor to Aktiebolaget Overums Bruk, Overum, Sweden, a joint-stock company of Sweden Application August 3, 1945, Serial No. 608,662
In Sweden November 7, 1944

2 Claims. (Cl. 97—50)

This invention relates to a device for regulating the depth or level of the ground engaging member in plows and other agricultural implements adapted, during working, to be carried by a servomotor operated lifting device on a tractor or the like. The main object of the invention is to provide an arrangement in which the implement cannot only be brought to a desired level determined by manual control means but is also automatically kept at the desired working depth irrespective of variations in the draft of the implement.

Other objects of the invention will appear in the following description and from the appended claims.

The invention will be described in the following under reference to the annexed drawing showing a diagrammatic side view of an embodiment of the invention as applied to a one-furrow tractor plow without carrier wheels of its own.

The plow shown in the drawing has a frame 1 with a plow share 2 and a transversal, horizontal shaft 3 which, by means of a vertically swingable link 4 on each side of the frame, is coupled to the body 5 of a tractor. The latter is also connected with an upright portion 6 of the frame by means of a link 7 which is about as long as and parallel to the links 4, so that the plow may be raised and lowered relatively to the tractor substantially parallel to itself. The lifting device comprising these links is vertically adjustable by means of some suitable servo-motor provided on the tractor. In the embodiment shown this motor comprises a single-acting piston 9 which is movable in a cylinder 8 and connected with each link 4 by means of a lever 10 mounted on the tractor, and a rod 11. By means of a valve 12 serving as a governor the cylinder 8 may be shut off from or put in communication with a pressure conduit 13 and a return conduit 14 for a driving medium, such as oil. The valve 12 is coupled to one end of a laterally movable lever 15 which, at a point 16, is hingedly connected with a substantially longitudinally movable rod 17 and at its opposite end can be operated upon by some manual setting member, such as a swingable eccentric 18, the lever making contact therewith under the action of a spring 19 or the like. The rod 17 is connected to a rocker 20 pivotally mounted on the tractor. This rocker is coupled to a ground feeling device serving as a depth control member which, in the embodiment shown, comprises a skid 21 hingedly connected to one arm 22 of a two-armed lever 22, 23 mounted to swing about a shaft 24 in a vertical plane through the direction of travel, and the other arm 23 of which, by means of a pressing rod or the like, has a motion transmitting connection with the rocker 20. In the embodiment shown this connection comprises a sleeve 25 which is substantially parallel to the links 4 and 7 and has a pin or roller 26 engaged by a slot 27 in the arm 23. The sleeve is guided by two rods 28, 29 pivotally connected to the portion 6 and the rocker 20, respectively, and is adapted to make contact with a flange 30 on the said rod, the rocker 20 being swingable about the same center 31 as the link 7. The skid 21 is adapted to trail on the ground on the unplowed side of the plow under the pressure, for instance, of a spring 32 mounted on the rod 17 and compressed between an adjustable flange or nut 33 on the rod and a guide-flange 34 for the same mounted on the tractor. The lever arms 22 and 23 are adjustable as to their mutual angular position by being interconnected, at some distance from the shaft 24, by means of a link of adjustable length comprising a screwed rod 35 which is rotatably but not slidably mounted in a sleeve 36 pivotally connected to the arm 22, and is provided with a nut 37 pivotally connected to the arm 23. Moreover, the rod should be so arranged that a handle 38 mounted on the same is easily accessible from the place of the tractor operator.

In the position shown of the various parts of the plow and the tractor the cylinder 8 is shut off from the conduits 13, 14, and the plow frame is, consequently, kept at a level corresponding to the position of the piston 9. If the eccentric 18 is turned in the counter-clockwise direction into another position, the valve 12 is moved a corresponding distance to the right on the drawing, and the cylinder is put in communication with the pressure conduit 13, so that the plow frame is raised together with the plow share carried thereby. During this operation the lever 22, 23, still resting on the ground with its skid 21, automatically adapts its position to the decreasing working depth, the pivot point 16 and, consequently, also the valve 12 being thereby moved to the left, until the cylinder 8 is again shut off with the result that the lifting movement ceases. By turning the eccentric in the clockwise direction the lever 15 is first caused to swing about the pivot point 16, thereunder moving the valve 12 to the left, whereby the cylinder is put in communication with the return conduit 14, so that the plow is lowered under its own weight and the suck of the share, if any. According as the working depth increases, the lever 22, 23 is automatically swung against the action of the spring 32 while displacing the pivot point 16 to the right, the lever 15 being swung, by the action of spring 19, about the place of its contact with the eccentric while restoring the valve to the right. The larger the displacement of the eccentric, the longer is the distance the pivot point has to be moved in order that the valve shall be restored into the shutting or holding position shown and the adjustment movement be caused to cease. In the embodiment described the working depth will, consequently, vary substantially only with the position of the setting member 18.

By means of the setting member the tractor operator can easily lift the working tool over such obstacles in its path of travel that might give rise to an excessive stress on the implement. Preferably, the working tool should, however, be adapted automatically to release on encountering such obstacles. In the embodiment shown the plow share is thus fixed to an arm 39 pivotally mounted in the plow frame so as to swing in a vertical plane through the direction of travel, said arm being adapted, in the working position of the plow share, to rest against a locking surface on a slide 40 mounted in the plow frame and adapted to move out of its locking position in the path of the arm 39 against the action of a spring 41, when there is an excessive stress on the share 2.

In the embodiment shown the pressure of the skid against the ground may be varied by altering the mutual position of the arms 22, 23. Thereby also the relation between the position of the setting member 18 and the depth of the working tool is altered so that a certain position of the setting member will be answered by another depth than before. Consequently, it will also be possible to use the rod 35 as a manual setting member or, speaking more generally, to couple the setting member to the control member.

I claim:

1. In a tractor connected to an agricultural implement having a ground engaging member mounted on a frame, a connecting device between the tractor and the implement for maintaining the implement in different and substantially parallel operating positions and for lifting the implement into an inoperative position, said connecting device comprising a vertically swingable arm on the tractor pivotally connected at its rear end with said frame and a pressure transmitting link located above said arm and being pivotally connected at its ends with the tractor and said frame, a servo-motor on the tractor for operating said arm, a governor for controlling said servo-motor, a ground feeling device pivotally mounted on the implement, a connection between said feeling device and said governor including a link system for maintaining said frame automatically at a constant level relative to the ground, and means for manually adjusting said connection for varying the desired level of the frame.

2. In a tractor connected to an agricultural implement having a ground engaging member mounted on a frame, a connecting device between the tractor and the implement for maintaining the implement in different and substantially parallel operating positions and for lifting the implement into an inoperative position, said connecting device comprising a vertically swingable arm on the tractor pivotally connected at its rear end with said frame and a pressure transmitting link located above said arm and being pivotally connected at its ends with the tractor and said frame, a servo-motor on the tractor for operating said arm, a governor for controlling said servo-motor, a ground feeling device pivotally mounted on the implement, a connection between said feeling device and said governor including a lever provided on said feeling device and a link system for maintaining said frame automatically at a constant level relative to the ground, and a screw for adjusting the position of said lever relative to said feeling device for varying the desired level of the frame.

CLAES BERG.

REFERENCES CITED

The following references are of record in the file of this patent:

UNITED STATES PATENTS

| Number | Name | Date |
| --- | --- | --- |
| 534,403 | Mechwart | Feb. 19, 1895 |
| 534,426 | Cooper | Feb. 19, 1895 |
| 1,687,719 | Ferguson | Oct. 16, 1928 |
| 2,118,180 | Ferguson | May 24, 1938 |
| 2,118,181 | Ferguson | May 24, 1938 |
| 2,356,231 | Ferguson | Aug. 22, 1944 |
| 2,405,334 | Silver | Aug. 6, 1946 |

FOREIGN PATENTS

| Number | Country | Date |
| --- | --- | --- |
| 311,361 | Germany | Mar. 19, 1919 |
| 520,484 | Great Britain | Apr. 25, 1940 |
| 541,436 | Great Britain | Nov. 26, 1941 |